United States Patent
Miller

(10) Patent No.: US 6,735,718 B2
(45) Date of Patent: May 11, 2004

(54) PROTECTION SWITCH TO SUPPORT REDUNDANT APPLICATION OF CONVERTER UNITS

(75) Inventor: Gary M. Miller, Kearneysville, WV (US)

(73) Assignee: Hubbell Incorporated, Orange, CT (US)

(*) Notice: Subject to any disclaimer, the term of this patent is extended or adjusted under 35 U.S.C. 154(b) by 335 days.

(21) Appl. No.: 10/024,542

(22) Filed: Dec. 21, 2001

(65) Prior Publication Data

US 2003/0120967 A1 Jun. 26, 2003

(51) Int. Cl.[7] .............................. G06F 11/00
(52) U.S. Cl. .............................. 714/22; 714/14
(58) Field of Search .............................. 714/14, 22, 24, 714/44, 712, 713; 370/219, 217; 398/5

(56) References Cited

U.S. PATENT DOCUMENTS

| | | | |
|---|---|---|---|
| 4,451,916 A | | 5/1984 | Casper et al. |
| 4,837,856 A | | 6/1989 | Glista, Jr. |
| 4,993,019 A | | 2/1991 | Cole et al. |
| 5,081,619 A | * | 1/1992 | Nagata ........................ 370/217 |
| 5,146,357 A | | 9/1992 | Epstein |
| 5,185,736 A | | 2/1993 | Tyrrell et al. |
| 5,189,410 A | | 2/1993 | Kosugi et al. |
| 5,329,520 A | | 7/1994 | Richardson |
| 5,627,822 A | | 5/1997 | Edmaier et al. |
| 5,640,387 A | | 6/1997 | Takahashi et al. |
| 5,731,887 A | | 3/1998 | Fee |
| 5,754,528 A | | 5/1998 | Uchida |
| 5,757,599 A | | 5/1998 | Crane |
| 5,870,382 A | | 2/1999 | Tounai et al. |
| 5,914,794 A | | 6/1999 | Fee et al. |
| 5,940,410 A | * | 8/1999 | Szczepanowski et al. ... 370/535 |
| 5,941,992 A | | 8/1999 | Croslin et al. |
| 5,956,324 A | * | 9/1999 | Engdahl et al. .............. 370/242 |
| 5,987,526 A | | 11/1999 | Morales |
| 6,111,672 A | * | 8/2000 | Davis et al. .................... 398/5 |
| 6,125,111 A | | 9/2000 | Snow et al. |
| 6,181,676 B1 | | 1/2001 | Yao et al. |
| 6,188,667 B1 | | 2/2001 | Roberts et al. |
| 6,202,170 B1 | * | 3/2001 | Busschbach et al. .......... 714/11 |
| 6,256,291 B1 | | 7/2001 | Araki |
| 6,285,673 B1 | | 9/2001 | Blackburn et al. |
| 6,570,844 B1 | * | 5/2003 | Deschaine .................. 370/217 |
| 6,646,981 B1 | * | 11/2003 | Kinouchi et al. ........... 370/216 |
| 6,658,595 B1 | * | 12/2003 | Thamattoor .................. 714/11 |
| 2003/0120967 A1 | * | 6/2003 | Miller .......................... 714/22 |

OTHER PUBLICATIONS

Fujitsu Product General Description, FLM 150 ADM, Issue 9, May 1999.

* cited by examiner

Primary Examiner—Robert Beausoliel
Assistant Examiner—Bryce P. Bonzo
(74) Attorney, Agent, or Firm—Christian C. Michel; Alfred N. Goodman

(57) ABSTRACT

A network switch and method of switching are provided, in which first and second signal converters convert electrical signals to optical signals and vice versa. The network switch monitors alarm contacts and power drawn by the first and second signal converters, and switches from one to the other in the case of an alarm condition or power loss. In order to force a corresponding switch at the remote end, power is removed from one of the signal converters in order to force an alarm in the corresponding signal converter at the remote end.

22 Claims, 4 Drawing Sheets

PROTECTION SWITCH TO SUPPORT REDUNDANT APPLICATION OF CONVERTER UNITS

FIELD OF THE INVENTION

The present invention is related to protection circuits for communication networks. More specifically, the present invention is related to a protection switch to support the redundant application of electrical and optical signal converters.

BACKGROUND OF THE INVENTION

Fiberoptic communication networks are capable of carrying tremendous volumes of voice and data traffic. Businesses and individuals rely more and more on voice and data communications and are therefore becoming more heavily impacted by failure in communications equipment. In a fiberoptic network, optical fibers can become damaged or severed, and lasers can fail. Further, repeater equipment, and electrical and optical converter equipment, among others, are also sources of failure. Therefore, in order to increase the reliability of communication networks, backup systems have been developed. Protection channels are known in the art and are described, for example, in the U.S. Pat. No. 4,451,916 to Casper et al. Disadvantageously, Casper requires a twisted pair copper wire link coupled along the end terminal stations and each repeater station along the network for the purpose of monitoring and fault isolation in the event of a failure. Other protection schemes have been devised for high-speed data networks which require sophisticated add-drop multiplexing equipment to monitor the content of the signals being transmitted.

Typically, at either end of the fiberoptic network, signal converting equipment converts optical signals into electrical signals which can then be further processed to pull individual multiplexed data channels from a high-speed signal. It would be advantageous to provide multiple optical-to-electrical converter units at either end of multiple optical fibers to provide a redundant fiberoptic network. Thus, if one set of fibers failed, or if one signal converter unit at either end of an optical fiber failed, a backup path could be placed into service. Therefore, it would be desirable to provide a simple mechanism for automatically switching between redundant fiberoptic paths through multiple signal converting units.

SUMMARY OF THE INVENTION

The above described disadvantages are overcome and other advantages are realized by providing a network switch for connecting redundant signal converting devices to a communications port. The signal converting devices preferably convert optical signals to electrical signals for downstream transmission to subscriber equipment, and electrical signals from subscriber equipment to optical signals for upstream transmission. When the switch is in a first state, electrical signals from the first signal converting device are connected to the communication port. When the switch is in a second state, electrical signals from the second signal converting device are connected to the communication port. The network switch monitors alarm contacts of both signal converting devices, as well as the nominal current drawn by each signal converting device. If the alarm contacts are activated for the active signal converting device, or if the nominal current drawn by the active signal converting device stops, the network switch switches to the second state. The network switch also terminates power to the active signal converting device temporarily, to force an alarm condition at the far end, causing a corresponding remote network switch to switch to the corresponding backup signal converting device.

According to a further aspect of the invention, the network switch provides output alarm contacts, and closes a relay between the output alarm contacts if the alarm contacts associated with the first signal converting device are closed.

According to another aspect of the invention, a method of providing backup communications is described. Two signal converting devices are provided, which preferably each convert optical signals to electrical signals. The electrical signals from each signal converting device are connected to a network switch, which in turn can switch between a first state, in which the electrical signals from the first signal converting device are connected to a communication port, and a second state in which the electrical signals from the second signal converting device are connected to the communication port. The method further includes monitoring the alarm contacts associated with the first signal converting device, as well as measuring the nominal current drawn by the first signal converting device. If an alarm is detected, or if the nominal current decreases substantially, the method includes removing power from the first signal converting device temporarily, and switching to the second state, so that the electrical signals from the second signal converting device are connected to the communication port.

According to yet another aspect of the invention, the above method further includes closing output alarm contacts if an alarm is detected in the alarm contacts associated with the first signal converting device.

BRIEF DESCRIPTION OF THE DRAWINGS

These and other aspects of the invention will be more readily apparent upon consideration of the following description and the attached drawings in which.

In the accompanying drawings, like numerals will be understood to refer to like features.

DETAILED DESCRIPTION OF THE INVENTION

Figure 1:
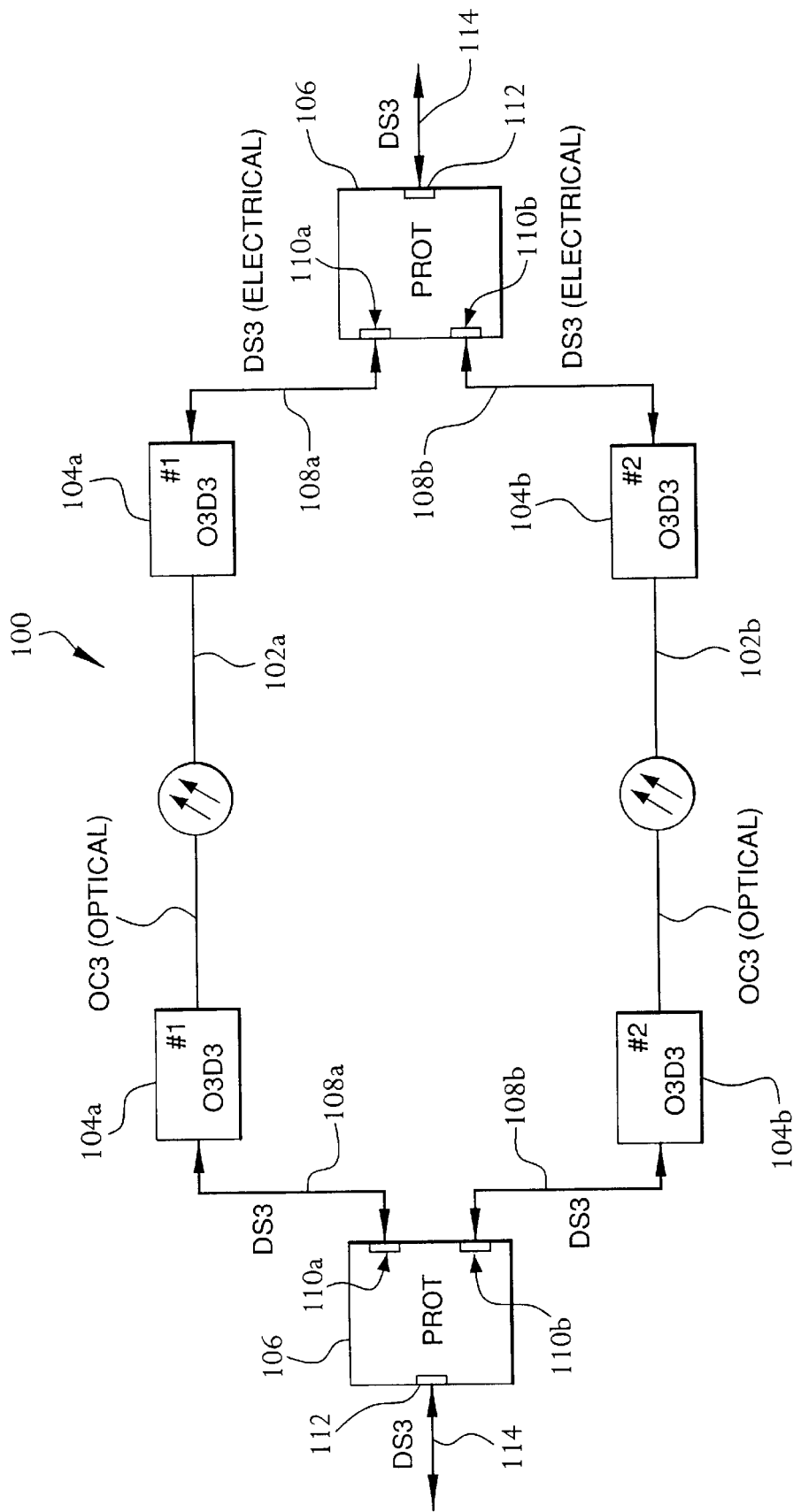
FIG. 1 is a block diagram of a redundant network in accordance with an embodiment of the present invention.

A redundant network 100 in accordance with an embodiment of the present invention is shown in FIG. 1. This network arrangement uses a pair of optical to electrical signal converters 104a and 104b at either end of redundant optical fibers 102a and 102b to provide a redundant network connection. As shown in FIG. 1, there are two fiberoptic lines 102a and 102b which carry optical signals to either end of the network. The optical fibers and signal converters shall be referred to generally as 102 and 104, respectively. Preferably, each optical fiber 102 comprises two physical fibers to carry signals in both directions. At either end of each optical fiber 102, there are signal converting units 104.

Each signal converting unit 104 converts optical signals from the corresponding optical fiber 102 into electrical signals which are carried toward a network switch 106 at either end of a network on electrical conductors 108. The optical signals carried on optical fibers 102 are preferably in the form of OC3 signals, as defined in (specification document). Similarly, the electrical signals carried on conductors 108 are preferably in the form DS3 signals. It is to be understood, however, that other types of optical and digital signals can be used.

Each network switch 106 has two network interfaces 110a and 110b and is capable of connecting either interface 110a or 110b to communications port 112. Electrical signals are passed from either network switch 106 through communications port 112 and on to other parts of the network through further network connections 114. Thus, when the network switches 106 at either end of the redundant optical fiber 102 are in a first state, communications port 112 is connected to interface 110a and communications occur through the corresponding pair of signal converting units 104a and the corresponding optical fiber 102a. If, however, the network switch 106 is in a second state, then communications port 112 is connected to interface 110b and communications occur through the second corresponding pair of signal converting units 104b and their corresponding optical fiber 102b.

Figure 2:
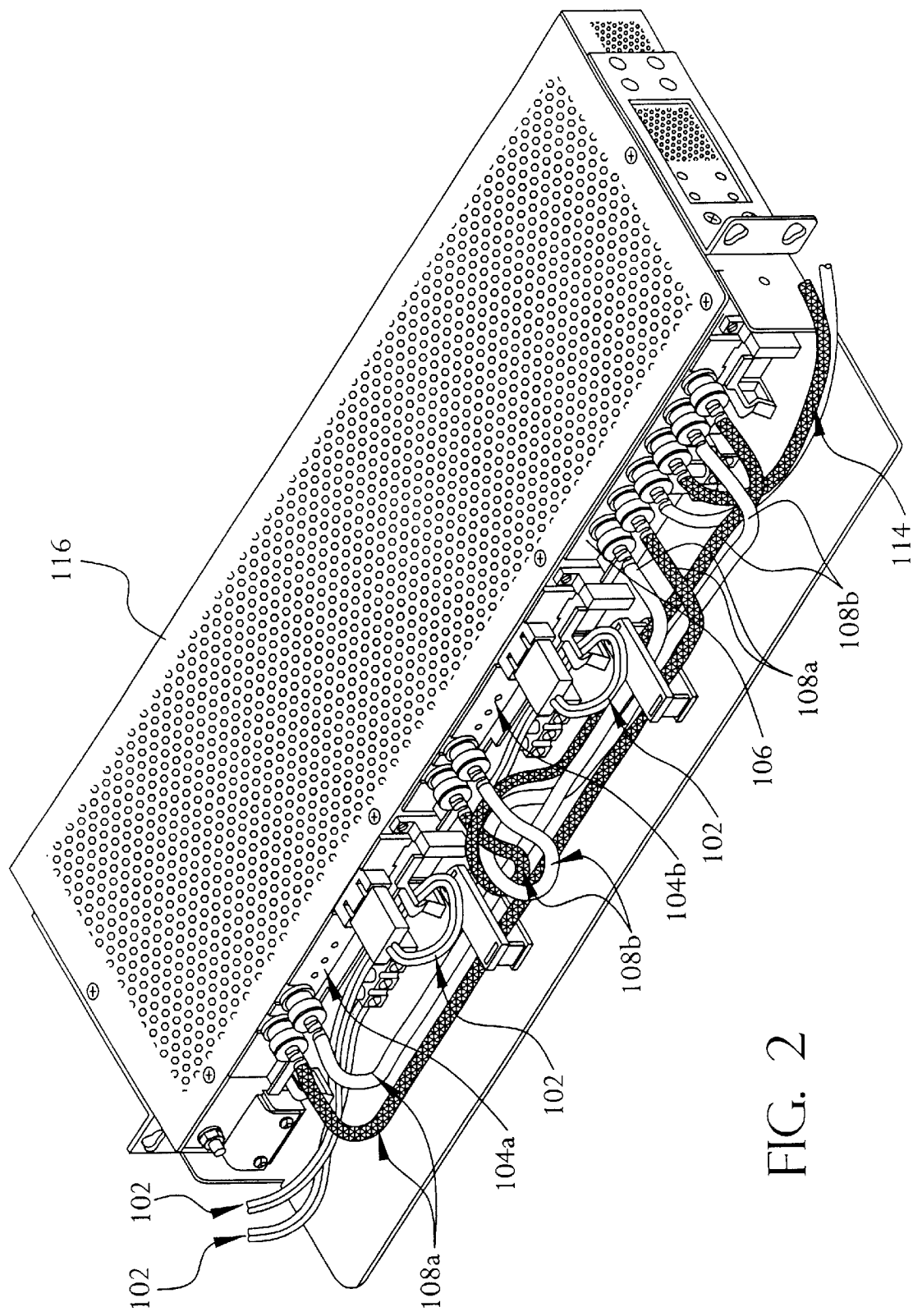
FIG. 2 is a perspective view of two signal converting units connected to a network switch, the units and switch being mounted in a housing, in accordance with an embodiment of the present invention.

FIG. 2 illustrates two signal converter units 104a, 104b and a corresponding network switch 106 connected together and mounted in a housing 116. The signal converter units 104a, 104b each have a pair of optical fibers 102 connected to the front panel of the signal converter 104.

Each of these converter units 104a, 104b also has a pair of electrical conductors 108a, 108b for carrying electrical signals connected to the front panel of the signal converter unit 104. The electrical conductors 108a, 108b carry electrical signals from the signal converter units 104a, 104b to the network switch 106. The network switch 106, in turn, selects one of the parallel electrical conductors 108a, 108b and connects them to the rest of the network via electrical conductors 114. The pair of signal converters 104a, 104b and the network switch 106 are shown mounted in a housing 116. The pair of signal converters 104a, 104b and the network switch 106 mounted in the housing 116 corresponds to one half of the network depicted in FIG. 1. Each of the devices 104a, 104b, 106 are preferably designed to comply with a standard 200 mechanic form factor. Each of the units shown in FIG. 2 have additional electrical connections along a backplane (not shown). The backplane electrical connections include additional features such as alarm contacts and power supply terminals.

Figure 3:
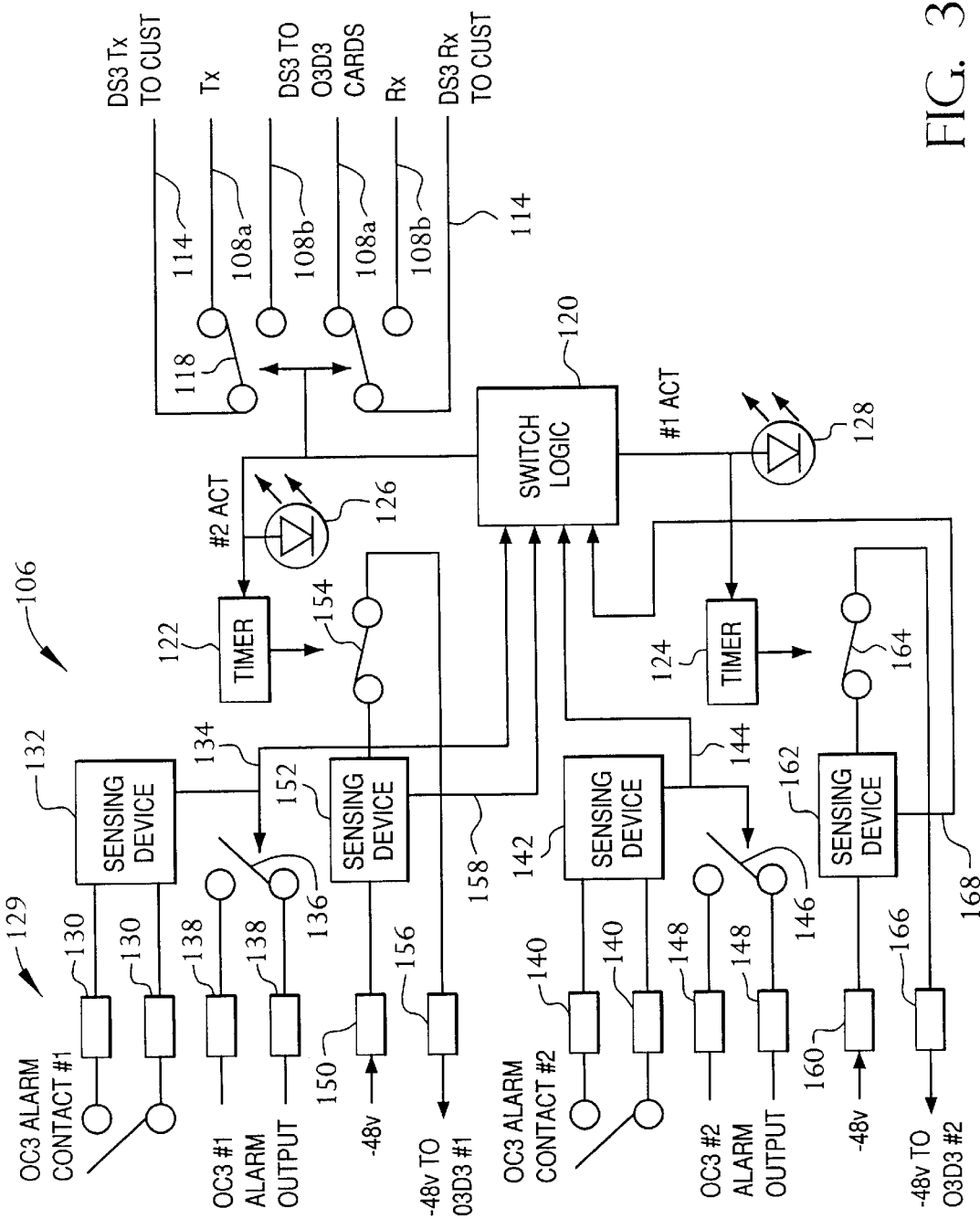
FIG. 3 is a block diagram of a network switch according to an embodiment of the present invention.

A preferred embodiment of the network switch 106 is illustrated in FIG. 3. Transmit and receive lines 108a are connected to the transmit and receive lines 114 through selection relay 118. Transmit and receive lines 108a are connected to one of a pair of signal converting devices 104a and 104b (FIG. 1). Transmit and receive lines 108b are connected to the other one of the signal converting device pair. Selection relay 118 connects the transmit and receive lines from either the first or the second signal converting device 104 to the output lines 114. Selection relay 118 is controlled by switch logic device 120. Switch logic device 120 also controls timers 122, 124 and LEDs 126, 128, the functions of which are described below.

A series of electrical connections indicated generally at 129 in FIG. 3 are preferably provided along a backplane. The backplane connections 129 allow the network switch 106 to sense the status of each signal converting device 104, and further to manipulate the devices in order to cause a remote network switch 106 to switch to the appropriate signal converting device 104 and optical fiber 102.

With continued reference to FIG. 3, a pair of electrical connectors 130 are provided to sense the status of an alarm contact output associated with the first of the pair of signal converting devices (e.g., signal converter unit 104a). The electrical connectors are connected to a sensing device 132 which senses whether the alarm contacts associated with the first signal converting device 104 are open or closed. A closed alarm contact preferably indicates an alarm condition, such as a failed laser or optical fiber, or other problems. The alarm contact sensing device 132 provides a control signal 134 to the switch logic device 120, which indicates the status of the alarm contacts 130. A duplicate alarm output relay 136 is used in combination with electrical connectors 138 to duplicate the status of contacts 130. Similar electrical contacts 140 are provided to sense the alarm contact status of the alarm associated with the second signal converting device 104a and alarm contact sensing device 142 senses the status of the alarm contacts relays and provides a control signal 144 which is relayed to switch logic device 120 and a second duplicate alarm output relay 146. The second duplicate alarm output is provided through electrical contacts 148.

As shown in FIG. 3, the power supply for the first signal converting device 104 is connected to electrical connector 150, power supply sensing device 152, power cutoff relay 154, and is finally provided to the first signal converting device 104a through electrical connector 156. Power supply sensing device 152 senses whether a nominal current is being drawn by the first signal converting device 104a, and relays the status of the power supply to switch logic device 120 through control line 158. A nominal current sensed by current sensing device 152 is indicative of whether a signal converting device 104 is plugged into the backplane or not. This is important because open alarm contact relays may indicate a non-alarm condition. In this manner, a fault condition can be sensed even if the signal converting device 104 is missing, resulting in open alarm contact relays.

Similarly, the power supply for the second signal converting device 104b is routed through electrical connector 160, current sensing device 162, power supply cutoff relay 164, and is finally provided to the second signal converting device 104b through electrical connector 166. The status of the nominal current drawn by the second signal converting device 104b is provided to switch logic device 120 through control line 168.

In operation, relay 118 defaults to the first signal converting device contacts. In the event that a fuse blows in the network switch 106, or if power is lost to the network switch 106, it is preferable that the default position of relay 118 connects one or the other of the pair of signal converting devices 104. For illustrative purposes, the default connection is to the first of the two signal converting devices 104. Under normal operation, switch logic device 120 monitors the status of alarm contact sensing device 132 and 142, as well as the status of power supply sensing devices 152 and 162. If switch logic device 120 senses that there has been a failure with the first signal converting device 104a (e.g., the alarm contact sensing device 132 or power supply sensing 152 indicates a failure), then switch logic device 120 controls relay 118 to switch the connection to the second signal converting device 104b.

If a switch to the second signal converting device is required, the switch logic device 120 also activates timer 122 which opens power cutoff relay 154 for a predetermined amount of time. Thus, power cutoff relay 154 removes power from the first signal converting device 104a, which results in loss of signal to the corresponding first signal converting device 104a at the remote end of the fiber network. This, in turn, causes an alarm condition at the remote end that is sensed by the corresponding network switch 106 at the remote end, causing the remote network switch also to switch to the corresponding second signal converting device.

Similarly, if relay 118 is connected to the second signal converting device 104b and either an alarm condition, or loss of nominal current, are sensed at alarm sensing device 142 or current sensing device 162, then switch logic device 120 causes relay 118 to switch back to the first signal converting device 104a. Switch logic device 120 also controls LEDs 126 and 128 to visually indicate which signal converting device is presently active.

Figure 4:
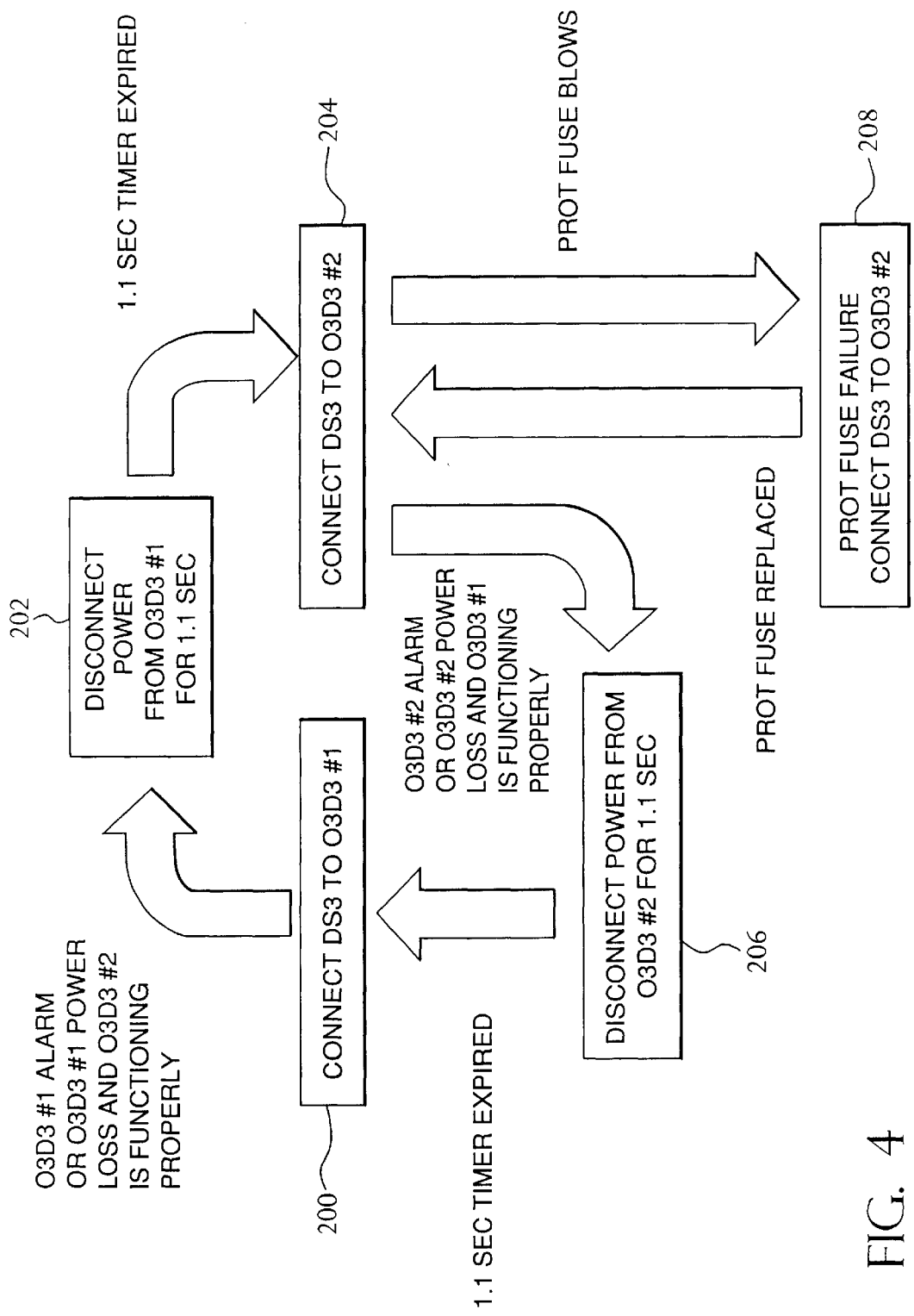
FIG. 4 is a state diagram illustrating the functionality of a network switch constructed in accordance with an embodiment of the present invention.

FIG. 4 further illustrates the functionality of a network switch 106 through a state diagram. In the first state 200, the output line 114 is connected to a first signal converting device. If the alarm from the first signal converting device is sensed, or if power loss to the first signal converting device is sensed and the second signal converting device is functioning properly, then state 202 is entered. In state 202, timer 122 is activated, opening power cutoff relay 154 and thereby disconnecting power from the first signal converting device. The power cutoff is preferably 1.1 seconds, but any other length of time is contemplated to be within the scope of the invention. After the timer expires, the network switch enters state 204 in which output 114 is connected to a second signal converting device. Once in this state, if an alarm condition for the second signal converting device is sensed, or if power loss to the second signal converting device is sensed, and the first signal converting device is functioning properly, then state 206 is entered. During state 206, timer 124 is activated, causing power cutoff relay 164 to open to remove power from the second signal converting device for a period of time which is preferably 1.1 seconds. After timer 124 expires, the system returns to state 200 and the first signal converting device is connected to output line 114. If power to the network switch 106 is lost (e.g. due to a fuse failure), relay 118 defaults to connecting output 114 to the second signal converting device, as shown at state 208.

Although only a few examples of embodiments of this invention have been described in detail above, those skilled in the art will readily appreciate that many modifications are possible in the exemplary embodiments without materially departing from the novel teachings and advantages of this invention. Accordingly, all such modifications are intended to be included in the scope of this invention as defined in the following claims.

What is claimed is:

1. A network switch for providing a redundant network connection, said network switch comprising:
   a first communication port, a second communication port and a third communication port, said first communication port being connected to said switch, said switch selectively operating in one of a first state in which said first communication port is connected to said second communication port, and a second state in which said first communication port is connected to said third communication port, said second communication port being connected to a first signal converter, and said third communication port being connected to a second signal converter, and
   at least one of a first alarm monitor adapted to monitor a first alarm associated with said first signal converter, and a first power monitor adapted to monitor the power drawn by said first signal converter, said switch being adapted to temporarily disconnect power from said first signal converter and enter said second state if said first alarm monitor detects a first alarm or said first power monitor detects a drop in power drawn by said first signal converter.

2. The network switch of claim 1, further comprising at least one of a second alarm monitor adapted to monitor a second alarm associated with said second signal converter, and a second power monitor adapted to monitor the power drawn by said second signal converter, said switch being adapted to temporarily disconnect power from said second signal converter and enter said first state if said second alarm monitor detects a second alarm or said second power monitor detects a drop in power drawn by said second signal converter.

3. The network switch of claim 1, wherein said first, second, and third communication ports carry electrical signals.

4. The network switch of claim 3, wherein said electrical signals are DS-3 signals.

5. The network switch of claim 1, wherein said first and second signal converters are adapted to convert electrical signals to optical signals.

6. The network switch of claim 5, wherein said optical signals are SONET OC-3 signals.

7. The network switch of claim 1, wherein said switch is further adapted to default to said second state.

8. The network switch of claim 1, wherein at least one of said first communication port, said second communication port and said third communication port comprises a transmit line and a receive line.

9. The network switch of claim 1, further comprising a timer to delay switching to said second signal converter a selected amount of time following power cut-off of said first signal converter.

10. The network switch of claim 1, wherein said first and second alarms are indicated by closed relay contacts.

11. The network switch of claim 10, wherein said network switch further comprises duplicate alarm contacts, and said switch is further adapted to close a relay across said duplicate alarm contacts if said first alarm monitor detects said first alarm.

12. A method of providing a redundant network connection, said method comprising the steps of:
   monitoring a first alarm associated with a first signal converter, said first signal converter being operable to convert optical signals to electrical signals for transmission to a subscriber, and to provide said electrical signals to a communications port or a network switch;
   measuring a first current drawn by said first signal converter; and
   if said first alarm is detected, or if said first current measured decreases substantially, connecting said electrical signals from a second signal converter to said communications port.

13. The method of claim 12, further comprising the steps of:
   monitoring a second alarm associated with said second signal converter,
   measuring a second current drawn by said second signal converter,
   if said second alarm is detected, or if said second current measured decreases substantially, connecting said electrical signals from said first signal converter to said communications port.

14. The method of claim 13, further comprising the step of removing power from said first signal converter temporarily.

15. The method of claim 12, wherein said electrical signals are DS-3 signals.

16. The method of claim 12, wherein said first and second signal converters are adapted to convert electrical signals to optical signals.

17. The method of claim 12, wherein said optical signals are SONET OC-3 signals.

18. The method of claim 12, further comprising the step of connecting said electrical signals from said second signal converter to said communication port if said network switch loses power.

19. The method of claim 12, wherein said communication port comprises a transmit line and a receive line.

20. The method of claim 12, wherein said first and second alarms are indicated by closed relay contacts.

21. The method of claim 20, further comprising the steps of providing duplicate alarm contacts, and closing a relay associated with said duplicate alarm contacts if said first alarm is detected.

22. The method of claim 12, further comprising the step of removing power from said first signal converter temporarily.

* * * * *